United States Patent
Asano et al.

(10) Patent No.: US 6,327,614 B1
(45) Date of Patent: Dec. 4, 2001

(54) NETWORK SERVER DEVICE AND FILE MANAGEMENT SYSTEM USING CACHE ASSOCIATED WITH NETWORK INTERFACE PROCESSORS FOR REDIRECTING REQUESTED INFORMATION BETWEEN CONNECTION NETWORKS

(75) Inventors: Shigehiro Asano; Tatsunori Kanai; Shinichi Kanno, all of Kanagawa; Seiji Maeda, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/154,031

(22) Filed: Sep. 16, 1998

(30) Foreign Application Priority Data

Sep. 16, 1997 (JP) .................................... 9-250249

(51) Int. Cl.[7] .................................... G06F 15/167
(52) U.S. Cl. .......................................... 709/213; 711/112
(58) Field of Search .................................. 709/250, 249, 709/238, 213, 218; 370/395; 711/112, 113, 114

(56) References Cited

U.S. PATENT DOCUMENTS

| 5,163,131 | 11/1992 | Row et al. . |
|---|---|---|
| 5,355,453 | 10/1994 | Row et al. ............................ 709/219 |
| 5,537,585 | * 7/1996 | Blickenstaff et al. ............... 395/600 |
| 5,561,809 | * 10/1996 | Elko et al. ............................ 709/213 |
| 5,802,366 | * 9/1998 | Row et al. ............................ 709/250 |
| 5,848,293 | * 12/1998 | Gentry .................................. 710/5 |
| 5,864,554 | * 1/1999 | Rostoker et al. ..................... 370/395 |
| 5,915,094 | * 6/1999 | Kouloheris et al. ................. 709/219 |
| 5,933,603 | * 8/1999 | Vahalia et al. ....................... 709/235 |

(List continued on next page.)

OTHER PUBLICATIONS

Gemmill et al., "An API for scalable reliable multicast", IEEE, 1997, p. 60–64.*
Kontothanassis et al., Software cache coherent for large scale multiprocessors, IEEE, 1995, pp. 286–295.*
"Application of NFS Servers to Strategic Internet/Intranet Website Design," Technical Report 13, 2th Ed., by Roy Chua et al.. Auspex Systems Inc., Apr. 1997. **Downloaded from http://www.auspex.com/product 2k/ns2k/ns2klib_tech.htm (pp. 13 and 18 missing). (p. 1–27).
"A Scalable and Highly Available Web Server," by Daniel M. Dias et al., T. J. Watson Research Center, Yorktown Heights, NY.=8 pages=.

*Primary Examiner*—Le Hien Luu
*Assistant Examiner*—Bunjob Jaroenchonwanit
(74) *Attorney, Agent, or Firm*—Oblon, Spivak, McClelland, Maier & Neustadt, P.C.

(57) ABSTRACT

A server device is formed by a plurality of network interface processors connected to a network, each network interface processor having a network interface local memory functioning as a cache memory for storing a part of server data and a network interface local processor, at least one storage interface processor connected with a storage device for storing the server data, and a connection network for connecting the network interface processors and the storage interface processor. In this server device, the network interface local processor of one network interface processor carries out a control processing such that a requested data stored In the network interface local memory of the one network Interface processor is transmitted to the network when a request received from the network at the one network interface processor satisfies a prescribed first condition, and the request is given to the storage interface processor via the connection network when the request satisfies a prescribed second condition and the requested data is transmitted to the network upon receiving the requested data returned from the storage interface processor to the one network interface processor via the connection network in response to the request.

24 Claims, 11 Drawing Sheets

U.S. PATENT DOCUMENTS 5,995,708 * 11/1999 Corey .................................. 386/83
6,081,883 * 6/2000 Popelka et al. .................. 712/28
6,119,150 * 9/2000 Fujii et al. ........................ 709/213
6,275,953 * 8/2001 Vahalia et al. .................... 714/11

* cited by examiner

NETWORK SERVER DEVICE AND FILE MANAGEMENT SYSTEM USING CACHE ASSOCIATED WITH NETWORK INTERFACE PROCESSORS FOR REDIRECTING REQUESTED INFORMATION BETWEEN CONNECTION NETWORKS

BACKGROUND OF THE INVENTION

1. Field of the Invention

The present invention relates to a server device such as a Web server and a file management method to be carried out by the server device.

2. Description of the Background Art

As the speed of information distribution is drastically increased due to the progress of the Internet, more and more people are now making accesses to the Internet. Usually, the means for providing information is World Wide Wed (referred hereafter as Web), and the protocols used are HTTP (Hyper Text Transfer Protocol) and TCP/IP (Transmission Control Protocol/Internet Protocol). In order to provide information to many people, it is necessary to enhance the bandwidth of a network as well as the performance of a server that stores information to transmit information to a network.

The main required function of the server is to transmit information stored in a storage device to a network, but because a format of information stored in the storage device differs from a format of information to be transmitted to a network, so that there is a need to carry out the format conversion. In addition, there is a need to execute protocols in order to carry out communications using HTTP and TCP/IP.

Consequently, if all these processings are to be carried out by a single processor, the processing load on that processor becomes excessively large and causes a bottleneck in the performance improvement. Moreover, it would require a large memory bandwidth because the processor would be required to copy information within a memory very frequently for the sake of the format convention mentioned above.

Figure 1:
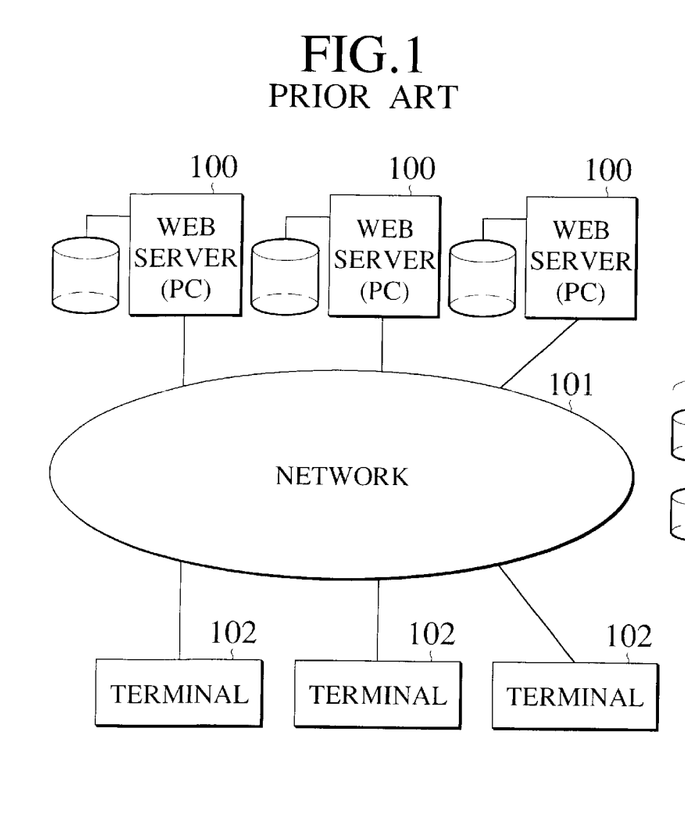
FIG. 1 is a schematic diagram showing a conventional distributed PC scheme.

One known way of easing these bottlenecks is to use servers in the multiprocessor scheme in which a plurality of processors and memories are connected together. For example, in the distributed PC scheme shown in FIG. 1, a plurality of Web servers 100 in forms of PCs are provided on a network 101 to which a plurality of terminals 102 are also connected, in order to improve the performance. However, in this distributed PC scheme, the file management becomes tedious because files are divided over a plurality of Web servers 100, while there is also a need to control a Web server 100 to which an access is to be made and a complicated management is required for this purpose as well. In addition, there is also a problem that if accesses are concentrated to files stored in one Web server 100, the processing load on that Web server 100 will be increased.

Also, in the shared memory multiprocessor scheme, the fact that a certain level of the hit rate can be expected for a cache memory of CPU is presupposed, and a bus and a memory bandwidth are provided under this presupposition. However, when the shared memory multiprocessor scheme is used in a Web server, there is hardly any hit In a cache of CPU and this causes a bottleneck so that it has been impossible to take a full advantage of the expensive high speed CPU processing power.

Figure 2:
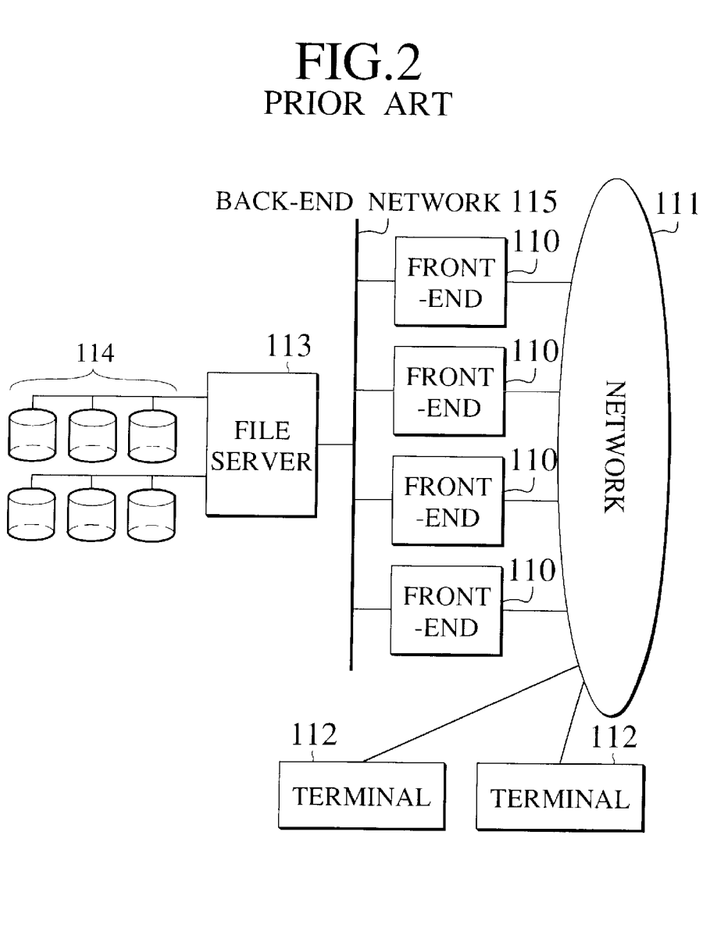
FIG. 2 is a schematic diagram showing a conventional front-end+file server scheme.

In addition, in the front-end+file server scheme shown in FIG. 2, HTTP is executed at the front-ends 110 connected to the network 111 to which a plurality of terminals 112 are also connected, while necessary files are requested to a file server 113 having storage devices 114, via a back-end network 115 (see "Application of NFS Servers to Strategic Internet/Intranet Website Design", Technical Report 13, Version 1.0, July 1996, Auspex Systems, Inc., Santa Clara, Calif.).

However, in this scheme, communications between the front-ends 110 and the file server 113 are to be handled by the back-end network 115. Here, the back-end network 115 is operated by the standard communication specification such as NFS in general, and there is a problem that the processing load on CPU will increase in both the front-ends 110 and the file server 113 in order to carry out such communications.

Figure 3:
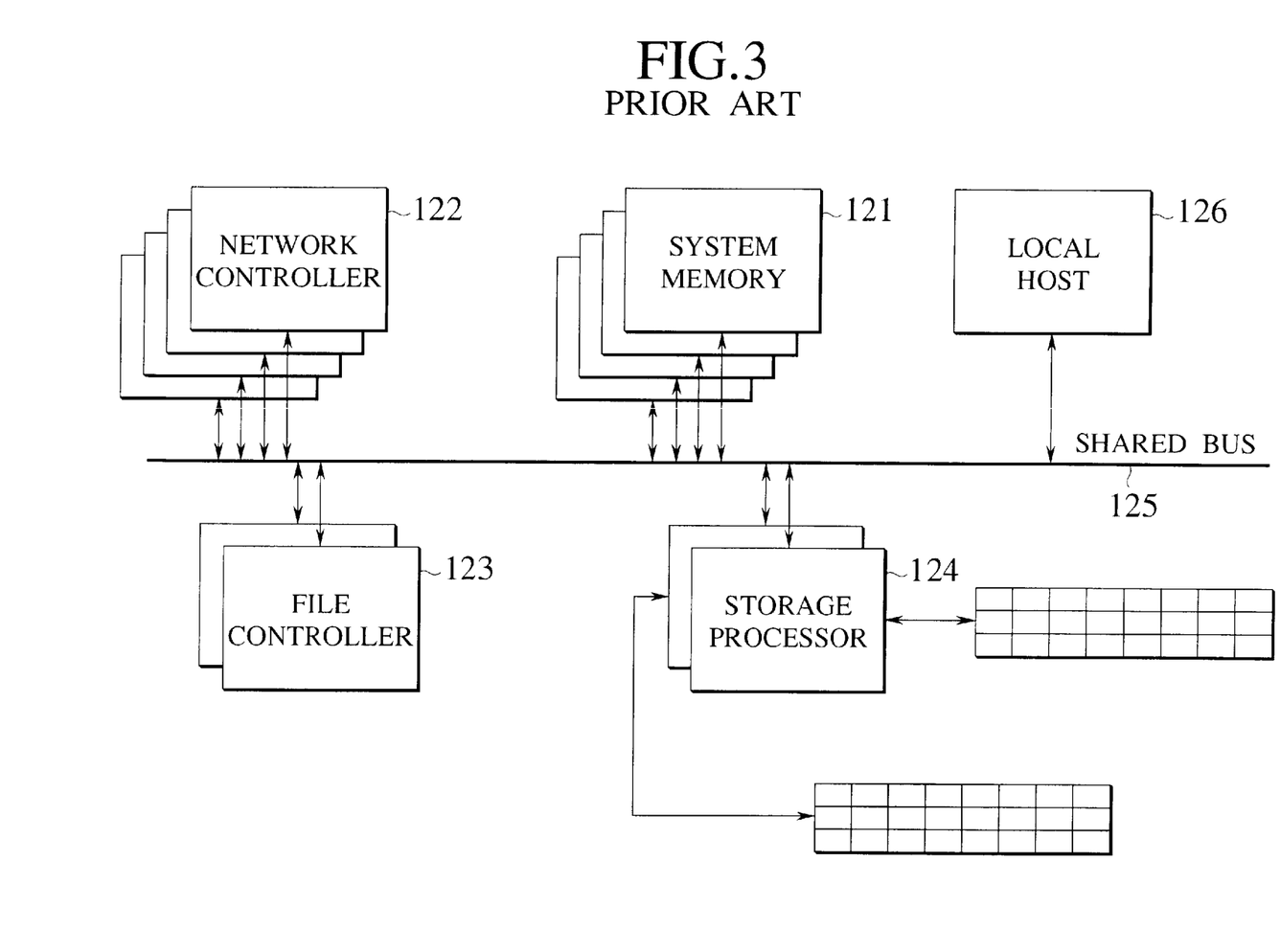
FIG. 3 is a schematic diagram showing a conventional function distributed multiprocessor scheme.

Also, the function distributed multiprocessor scheme uses a structure as shown in FIG. 3 in which system memories 121 is shared by network controllers 122, file controllers 123, and storage controllers 124, on a shared bus 125 to which a local host 126 is also connected (see U.S. Pat. No. 5,355,453).

However, in this scheme, the reading operations by a plurality of network controllers 122 are all concentrated to the system memories 121 so that there has been a problem that it tends to cause bottlenecks at the shared bus 125 and system memories 121.

Figure 4:
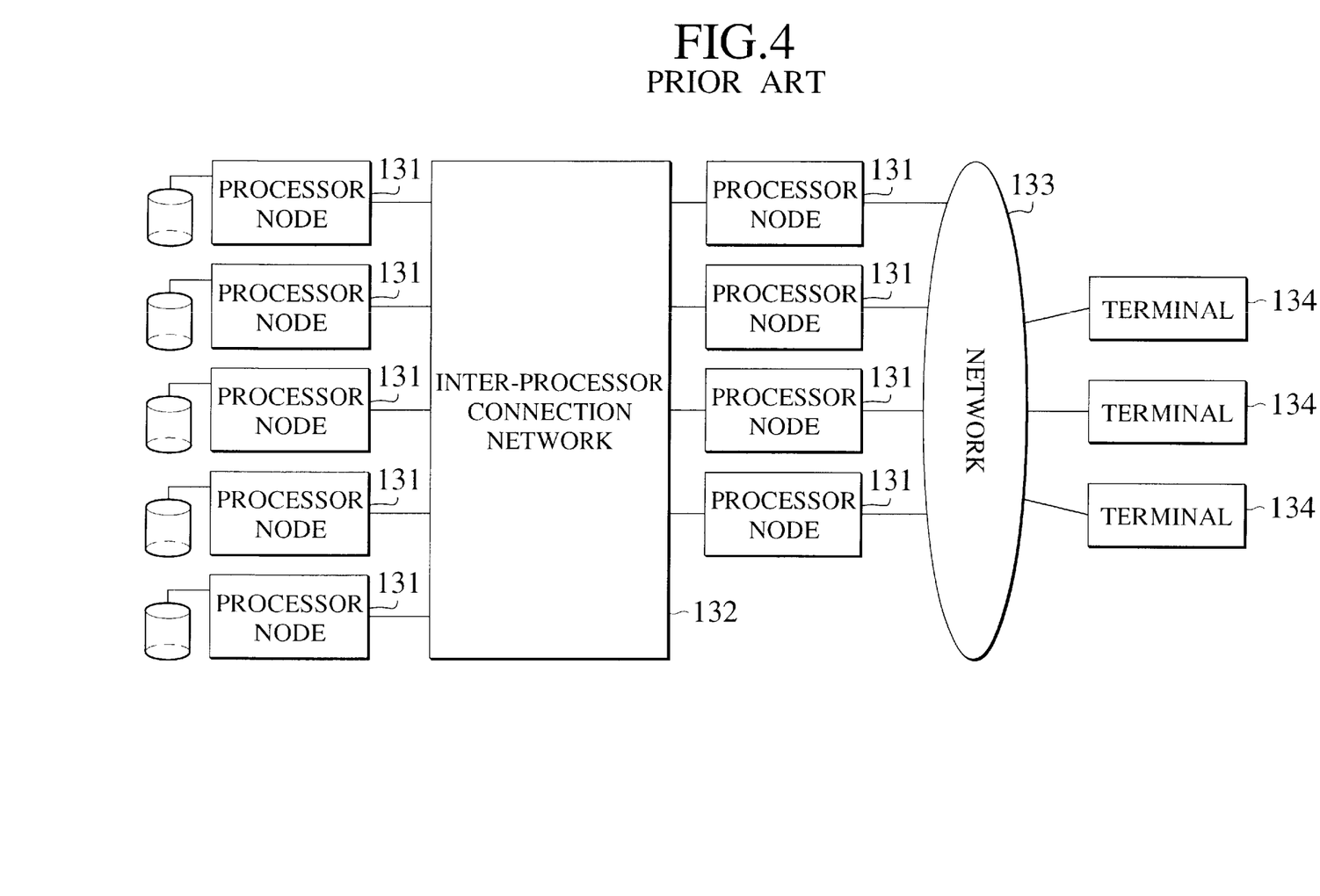
FIG. 4 is a schematic diagram showing a conventional sparsely-connected multi-computer scheme.

Also, in the sparsely-connected multi-computer scheme shown in FIG. 4, processor nodes 131 having an inter-processor connection network 132 which are connected with each other by the hyper-cube or the like and which are connected to the network 133 to which a plurality of terminals 134 are also connected is used as a Web server (see "A Scalable and Highly Available Web Server", Proceedings of the IEEE Computer Conference (COMPCON), Santa Clara, March, 1996).

However, in this scheme, there is a problem that a very high cost required for the inter-processor connection network 132 raises a cost of the system as a whole.

Thus the conventional server configurations are associated with problems such as a tedious management and a poor cost performance.

Now, TCP/IP is the protocol widely used for networks, and in the case of transmitting a TCP/IP packet to a network there is a need to calculate a parity with respect to the packet and attach it to a header portion. Conventionally, this parity calculation has been realized by reading out data to be transmitted at CPU, but this calculation not desirable as it exerts loads on both the memory bandwidth and CPU.

SUMMARY OF THE INVENTION

It is therefore an object of the present invention to provide a server device capable of realizing a simple management and a superior cost performance.

It is another object of the present invention to provide a server device with an efficient mechanism for transmission of information to a network.

It is another object of the present invention to provide a file management method which is efficient in a hierarchical cache system.

According to one aspect of the present invention there is provided a server device, comprising: a plurality of network interface processors connected to a network, each network interface processor having a network interface local memory functioning as a cache memory for storing a part of server data and a network interface local processor; at least one storage interface processor connected with a storage device for storing the server data; and a connection network for connecting the network interface processors and the storage interface processor; wherein the network interface local processor of one network interface processor carries out a control processing such that a requested data stored in the network interface local memory of the one network interface processor is transmitted to the network when a request received from the network at the one network interface processor satisfies a prescribed first condition, and that the request is given to the storage interface processor via the connection network when the request satisfies a prescribed second condition and a requested data returned from the storage interface processor to the one network interface processor via the connection network in response to the request is transmitted to the network.

According to another aspect of the present invention there is provided a file management method at a server device having a plurality of network interface processors connected to a network, each network interface processor having a network interface local memory functioning as a cache memory for storing a part of server data and a network interface local processor, at least one storage interface processor connected with a storage device for storing the server data, and a connection network for connecting the network interface processors and the storage interface processor, the method comprising the steps of: transmitting a requested data stored in the network interface local memory of one network interface processor to the network when a request received from the network at the one network interface processor satisfies a prescribed first condition; and giving the request from the one network interface processor to the storage interface processor via the connection network when the request satisfies a prescribed second condition and transmitting a requested data from the one network interface processor to the network upon receiving the requested data returned from the storage interface processor to the one network interface processor via the connection network in response to the request.

Other features and advantages of the present invention will become apparent from the following description taken in conjunction with the accompanying drawings.

DETAILED DESCRIPTION OF THE PREFERRED EMBODIMENTS

Referring now to FIG. 5 to FIG. 14, one embodiment of a server device and a file management method according to the present invention will be described in detail.

Figure 5:
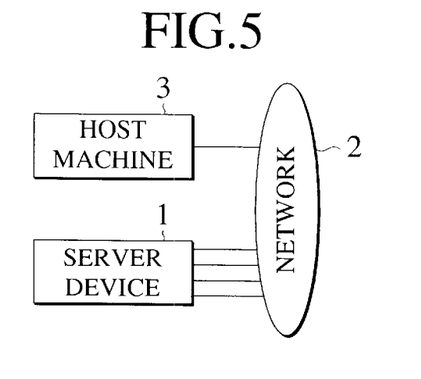
FIG. 5 is a schematic diagram showing a system using a server device according to one embodiment of the present invention.

FIG. 5 shows an overall configuration of a system using a server device according to this embodiment, where a server device 1 is connected with a host machine 3 through a network 2. In FIG. 5, only one host machine 3 is shown to be connected, but the present invention is not limited to this case and more than one host machines may be connected.

The server device 1 is provided with a function for transmitting data read out from a file to the network, as will be described below. Also, the server device 1 is connected with the host machine 3 and determines what is to be processed by the host machine 3. For example, the execution of CGI (Common Gateway Interface) in the Web server is processed by the host machine 3.

In the following, a method for distinguishing the CGI execution from the other accesses from files will be described in order to clarify the relationship between the host processor and the server device. In general the CGI execution is carried out under a prescribed directory of the server device. A directory under which the CGI execution is to be carried out is set up at the server device In advance, and the setting is also made such that accesses under this directory are to be re-directed to the host processor. Such a setting can be realized by using the environment file or the like, for example.

Figure 6:
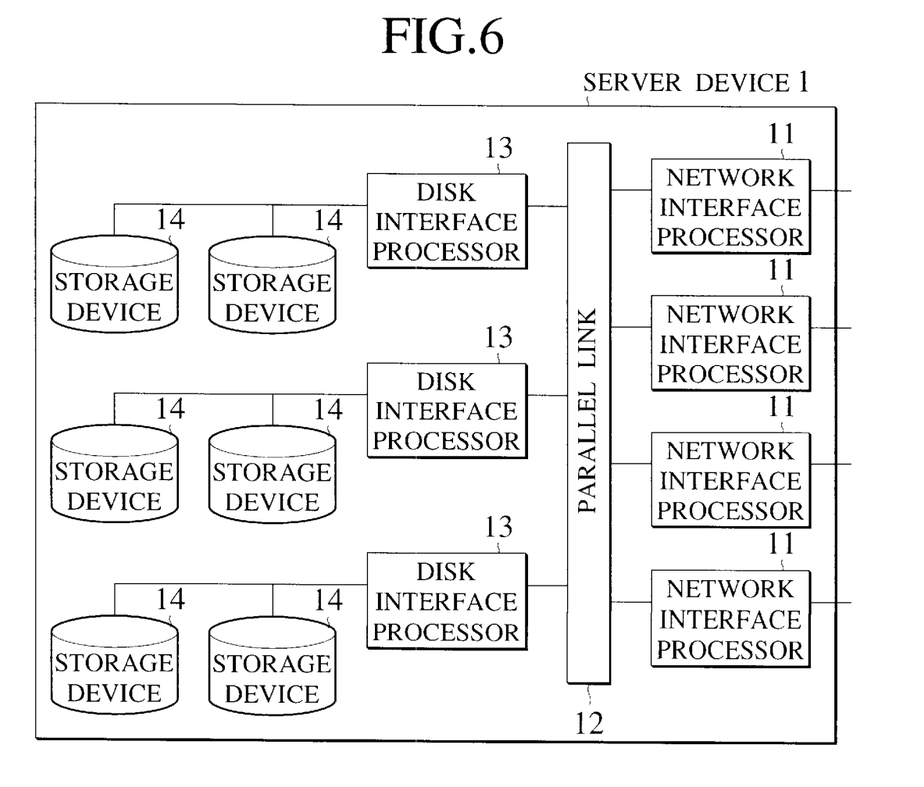
FIG. 6 is a block diagram showing a configuration of the server device according to one embodiment of the present invention.

FIG. 6 shows a configuration of the server device 1 in this embodiment, which is provided with a plurality of network interface processors (NIP) 11 connected to the network 2. Here, the network 2 can be Ethernet, for example, but it can also be the other network such as ATM.

Each NIP 11 is connected with a parallel link 12 which is an internal transmission path (the so call internal bus, for example) of the server device 1. This internal bus is not necessarily limited to the parallel link, and can be a serial link, switch, etc. Also, this parallel link 12 is connected with at least one disk interface processor (DIP) 13, and each DIP is provided with storage devices 14. The storage device 14 is realized by a magnetic disk drive, a disk drive, etc., for example.

Figure 7:
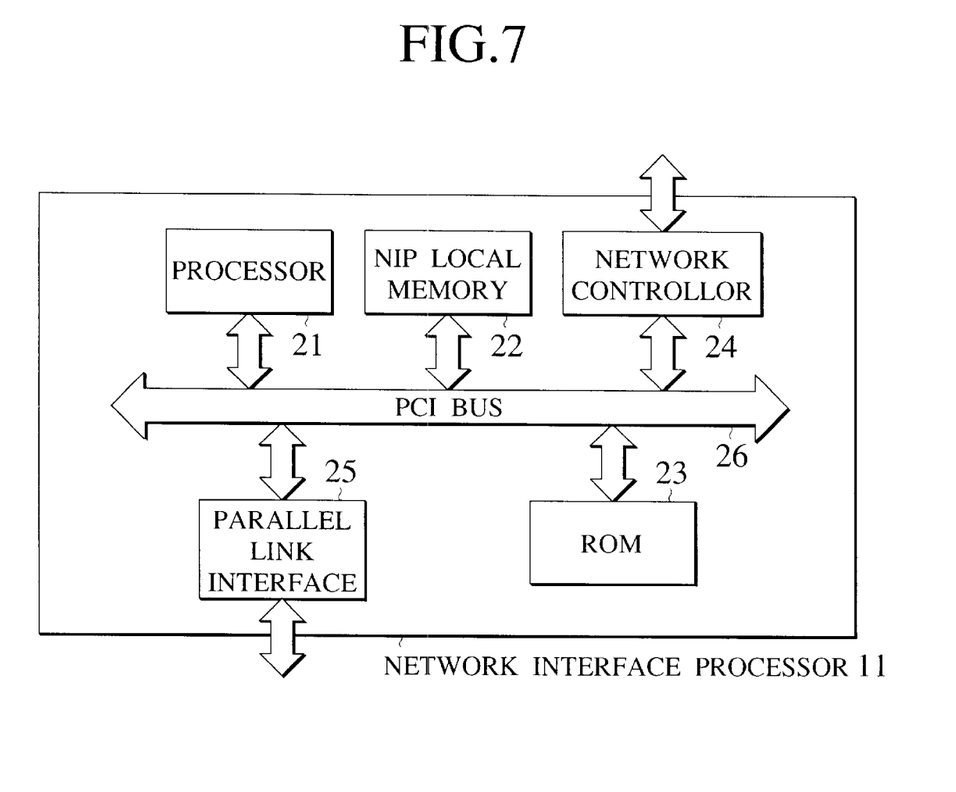
FIG. 7 is a block diagram showing a configuration of a network interface processor in the server device of FIG. 6.

FIG. 7 shows a configuration of the NIP 11, which comprises a processor 21, an NIP local memory 22, a ROM 23 for storing codes, a network controller 24, and a parallel link interface 25.

Program codes to be executed by the processor 21 are written in the ROM 23 in advance. In general the access speed of ROM is slow so that the content of the ROM 23 is copied to the NIP local memory 22 using a bootstrap program.

The above described units constituting the NIP 11 are connected by a standard bus such as PCI (Peripheral Component Interconnect) bus 26, for example. Note that the configuration of the NIP is not necessarily limited to that shown in FIG. 7, and it is also possible to connect the processor 21, the NIP local memory 22 and the PCI bus 26 by an ASIC (Application Specific Integrated Circuit) called bridge chip. The NIP bridge chip has a function for snooping a cache memory within the processor (different from a cache within the NIP local memory 22). Using this snoop mechanism, the DMA (Direct Memory Access) transfer can update the cache memory of the processor so as to maintain the consistency.

Next, the operation of the NIP 11 will be described in further detail.

A request from the network 2 to the server device 1 is transmitted to the NIP 11. The protocols to be used are TCP/IP and HTTP in general, but not necessarily limited to these. This request is interpreted at the processor 21 within the NIP 11 by executing a prescribed program instruction.

The processor 21 within the NIP 11 judges whether this request is to be executed by the host processor or not, and when it is judged as a request to be executed by the host processor, the processor 21 re-directs this request to the host processor.

On the other hand, when it is judged as a request to be executed by the server device 1, the processor 21 judges whether the requested data exists in the cache memory within the NIP 11 or not. In this embodiment, the NIP local memory 22 functions as a cache memory, but it may also contain a primary cache memory provided within the processor 21, for example.

Figure 8:
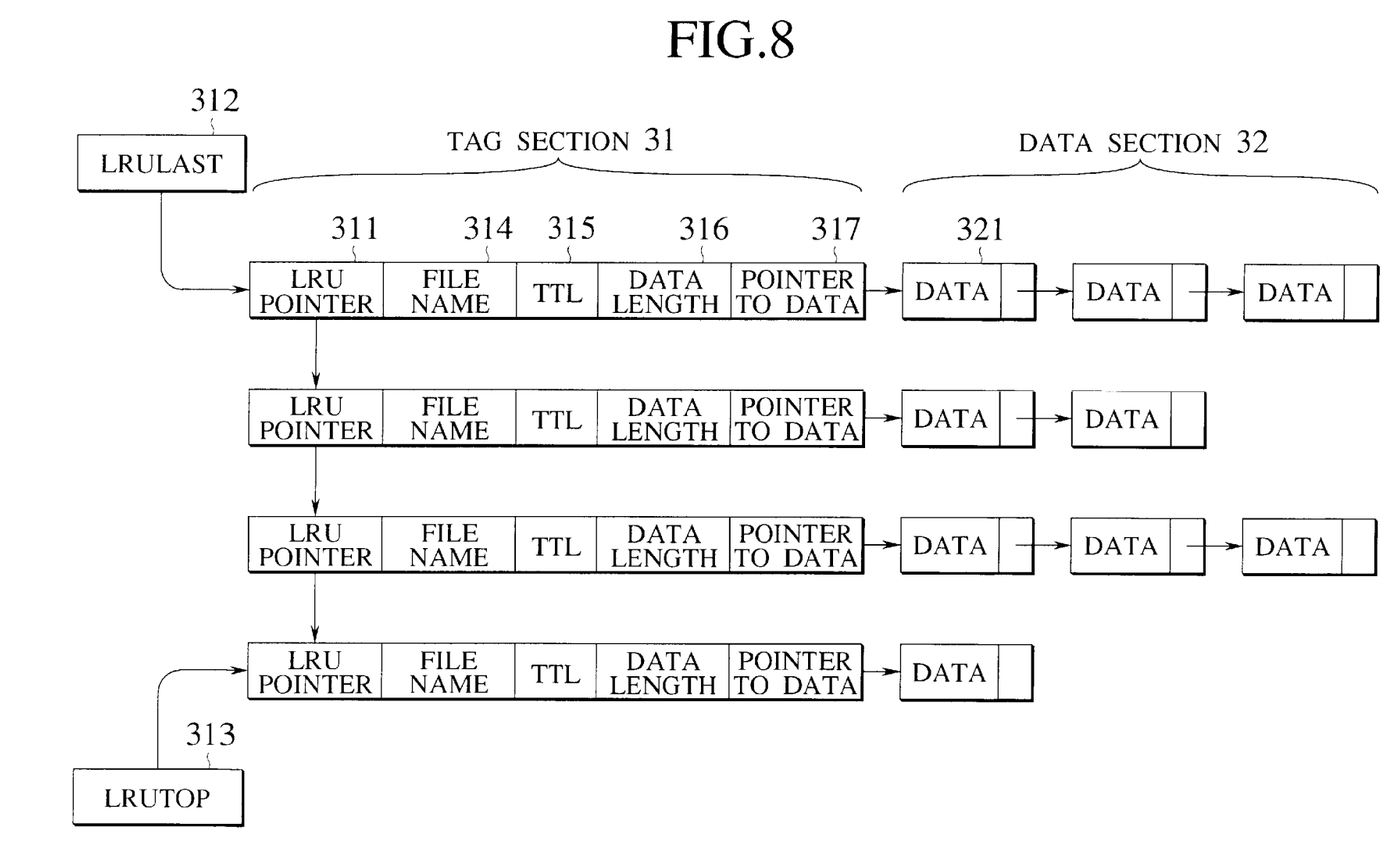
FIG. 8 is a diagram showing a cache entry structure used in a local cache memory of the server device of FIG. 6.

Here, the judgement as to whether a prescribed data exists within a cache memory or not, that is, a cache memory search, is realized as follows. FIG. 8 shows a structure of cache entries, where the cache content developed within the local memory comprises entries linked by LRU (Least Recently Used) pointers 311, of which LRULAST 312 points to an entry with the oldest last access time while LRUTOP 313 points to an entry with the newest last access time, and each entry comprises a tag section 31 and a data section 32. This link structure is updated whenever there is an access.

A file name field 314 holds a file name of data (file) held by each entry, which will be used as a tag. A TTL (Time To Live) field 315 indicates a valid period of the cached data. Namely, when it is judged that the valid period is over upon comparing a value in the TTL field 315 (TTL value) with the current time, the cached content will be regarded as invalid even if the cache hit occurs. This TTL field 315 is attached as a file attribute, and the TTL value is transferred at the same time as the file is transferred from the DIP 13 to the NIP 11. A data length field 316 indicates a length of data held by each entry, and a pointer to data field 317 indicates a top address of the data.

The data section 32 has a structure in which data divided into regions of a constant length (4 Kbytes for example) are linked by pointers, where data regions are managed by a free list. This structure is adopted in order to make the data region management easier in view of the fact that data to be cached are of variable length.

As described above, the search in the cache developed within the NIP local memory 22 is realized by comparing LRUs while sequentially tracing LRU pointers 311 starting from the LRULAST 312. As a technique for realizing a fast search, the known technique such as hashing can be used, but it is not absolutely necessary for the present invention.

Note that there is a limit in the cache memory capacity so that there is a need to expel a cached content at a time of entering a new content into the cache. To this end, the entry to be expelled can be determined according to the LRU algorithm or the like. When the entry to be expelled is determined, the NIP 11 notifies the entry to be expelled to the DIP 13. This completes the description of the cache search.

When the processor 21 judges that it is possible to transfer the requested data from the cache of the NIP local memory 22, the processor 21 forms an information such as header that is necessary for transmission to the network, and writes it in the NIP local memory 22. In addition, the processor 21 sets a DMA of the network controller 24 and transfers data from the NIP local memory 22 to the network controller 24 such that the network controller 24 transmits the requested data to the network 2. Here, the information such as header to be formed includes HTTP protocol header, TCP header, and IP header in the case of the Web server. For the network controller 24, INTEL 21140 of the INTEL corporation can be used for example. This chip is equipped with the PCI interface and the DMA controller.

When the processor 21 judges that the requested data cannot be supplied from the NIP local memory 22 and the request is not for the exeuction of CGI, the processor 21 issues a request to the DIP 13, and this request is transmitted through the internal bus (parallel link) 12. This request contains the necessary file information, as well as a buffer memory address on the NIP 11 side to be used at a time of transferring data from the DIP 13 to the NIP 11.

The processor 21 of the NIP 11 determines one of the DIPs 13 to which the request is to be transmitted. In this embodiment, the hash value according to the file name is obtained, and one DIP 13 is determined according to the hash value. For example, when there are three DIPs 13, the sum of character codes of the file name modulo 3 can be used as the hash function. Apart from the case of transmitting the request from the NIP 11 to the DIP 13, one DIP 13 is also determined by the similar method in the case of notifying the entry that was expelled, from the NIP 11 to the DIP 13 as described above.

Figure 9:
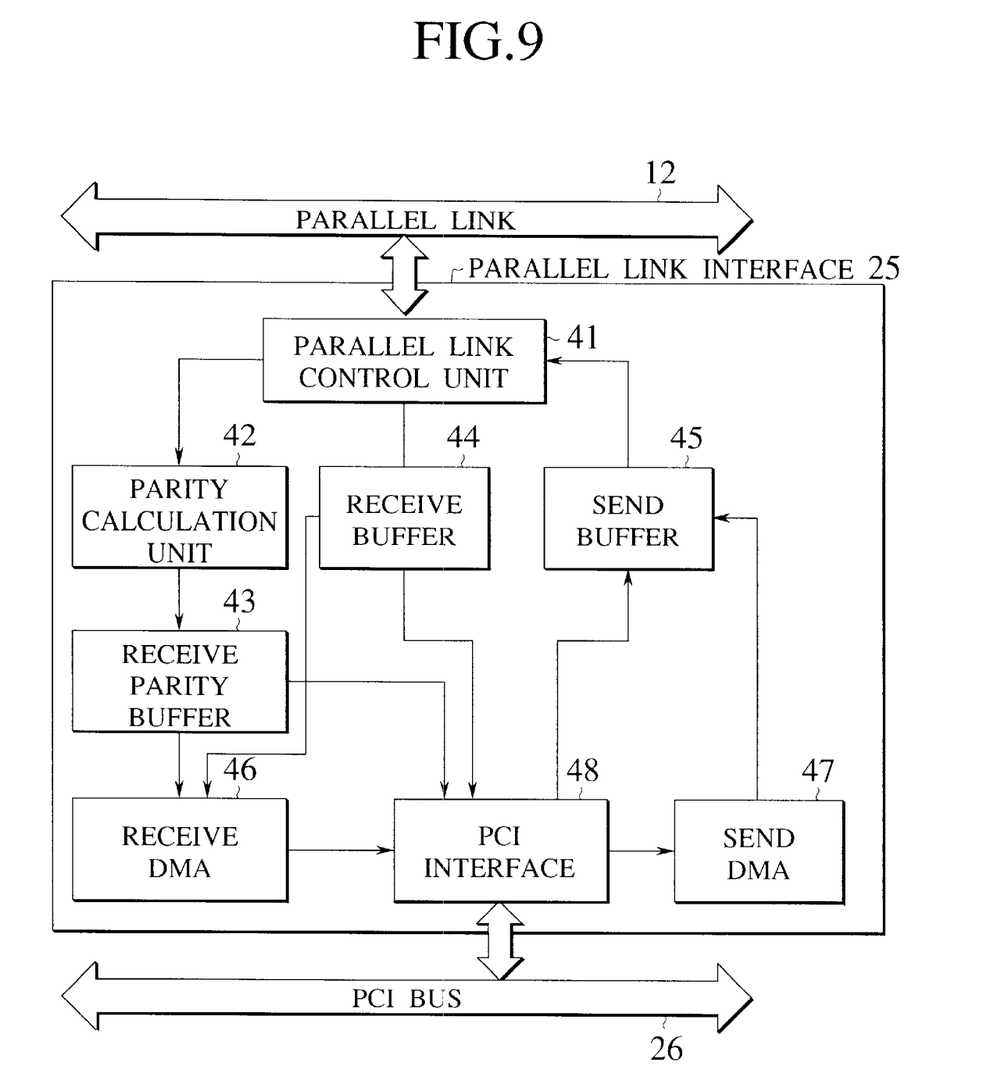
FIG. 9 is a block diagram showing a configuration of a parallel link interface in the network interface processor of FIG. 7.

FIG. 9 shows a configuration of the parallel link interface 25. As shown in FIG. 9, the parallel link interface 25 comprises a parallel link control unit 41, a parity calculation unit 42, a Receive parity buffer 43, a Receive buffer 44, a Send buffer 45, a Receive DMA 46, a Send DMA 47, and a PCI interface 48.

The parallel link control unit 41 allows only a communication (message) with the corresponding NIP 11 as its destination to pass among communications from the DIP 13, and transmits it to the parity calculation unit 42. The parity calculation unit 42 carries out the parity calculation, and writes the parity calculation result into the Receive parity buffer 43 for each prescribed number of words. The parity data is written into the Receive parity buffer 43 every time 256 words are transferred, in the case of using one writing in every 256 words, for example. Here, one word is assumed to be 16 bits in agreement with the TCP parity format.

The Receive DMA 46 transfers the parity data written in the Receive parity buffer 43 to the NIP local memory 22. In the case of producing a TCP packet at the processor 21 of the NIP 11, the parity data transferred from the Receive parity buffer 43 will be used. For example, when the TCP packet comprises 1024 words, the parity of the packet is produced from the 4 words parity data corresponding to these 1024 words. When 1024 words do not fit into 256 words alignment of the parity data, there is a need to calculate the parity for a fraction portion that does not fit into the alignment. By providing the Receive parity buffer 43, it is possible to considerably reduce the processing load on the processor 21 of the NIP 11 due to the parity calculation. In addition, by attaching the parity at every 256 words, it is possible to deal with a size of TCP packet flexibly.

For the request to the DIP 13, a command is formed by the processor 21 of the NIP 11 and transferred to the Send buffer 45 by the Send DMA 47, and further transmitted to the parallel link 12.

Figure 10:
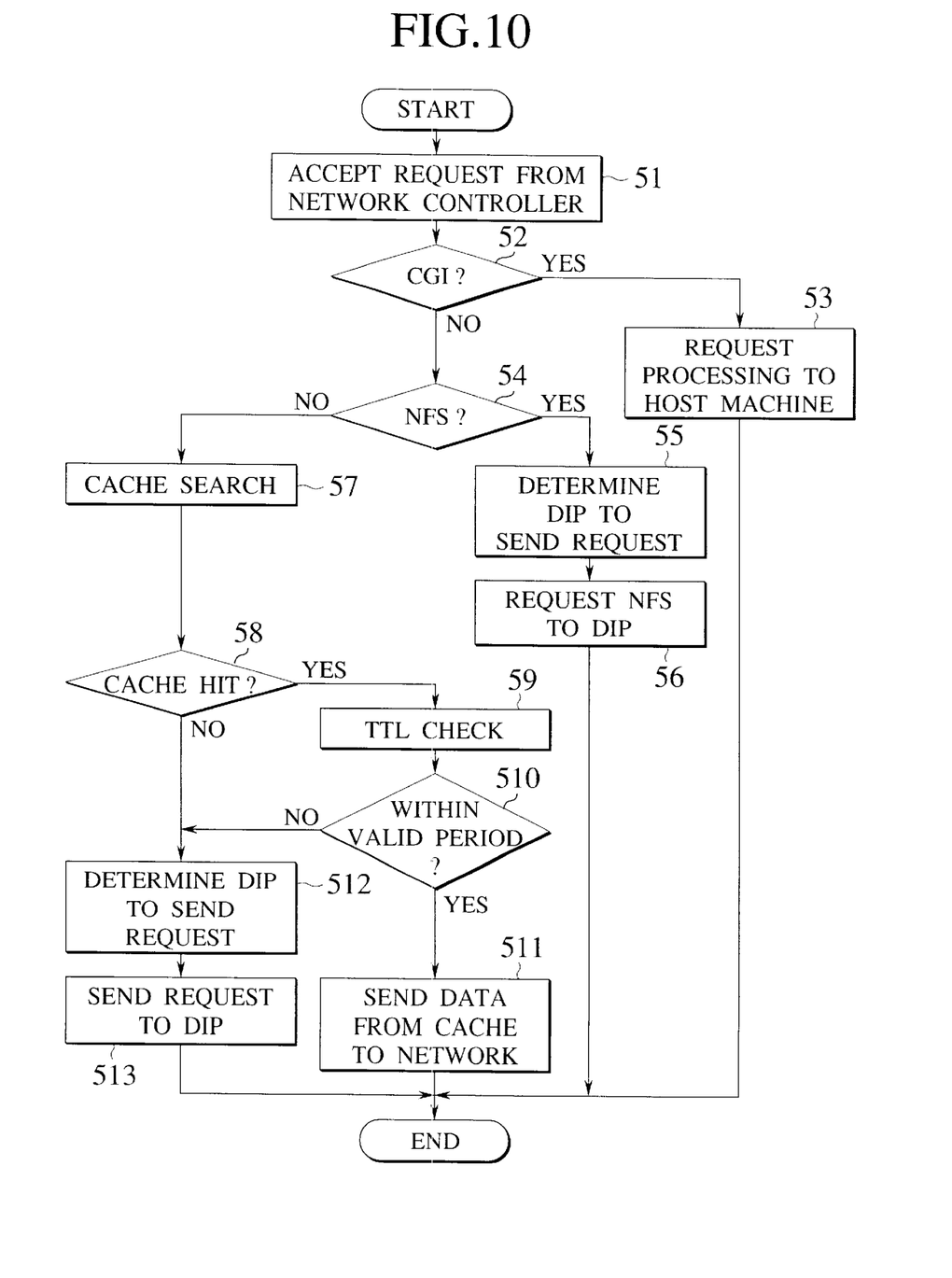
FIG. 10 is a flow chart for a processing by the network interface processor of FIG. 7 in the case of accepting a request from a network.

FIG. 10 is the flow chart for the processing in the case of accepting a request from the network 2 at the NIP 11, which proceeds as follows.

First, when the request from the network 2 is accepted through the network controller 24 (step 51), whether it is a CGI request or not is judged (step 52). When it is judged as CGI request, the processing is requested to the host machine 3 because the processor 21 of the NIP 11 is not set up to execute CGI (step 53). On the other hand, when it is judged as not a CGI request, whether it is an NFS (Network File System) request or not is judged next (step 54).

When it is judged as NFS request, the DIP 13 to which the request is to be sent is determined (step 55), and the NFS is requested to the determined DIP 13 (step 56). On the other hand, when it is judged as not an NFS request, the cache search as described above is carried out (step 57). When the cache hit occurs as a result of the cache search (step 58 YES), the TTL is checked (step 59), and whether it is within the valid period of not is judged (step 510). When it is judged that the TTL value is within the valid period, the data is transmitted to the network 2 from the NIP local memory 22 of the NIP 11 (step 511). On the other hand, when it is judged that the TTL value is not within the valid period, the DIP 13 to which the request is to be sent is determined (step 512), and the request is transmitted to the determined DIP 13 (step 513).

Figure 11:
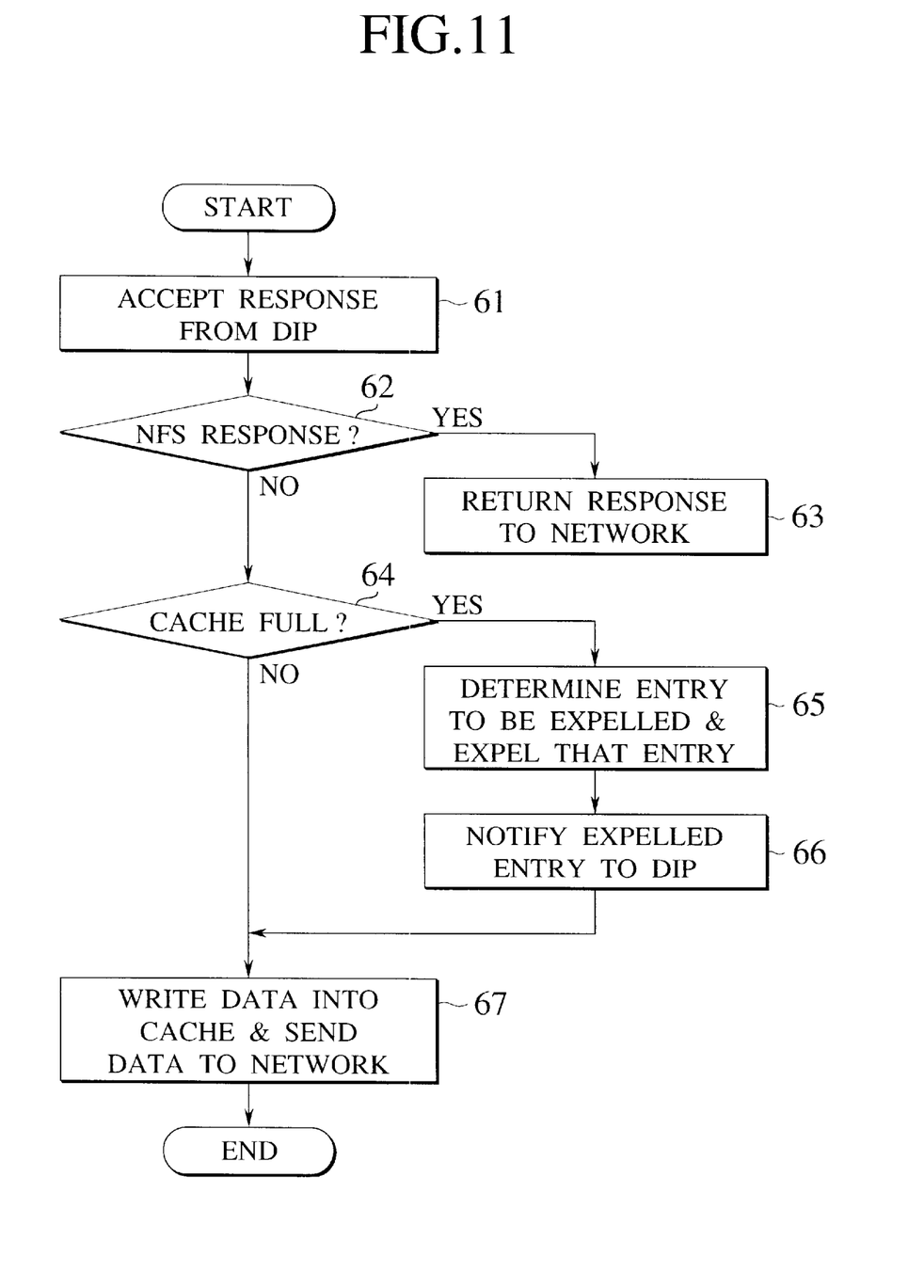
FIG. 11 is a flow chart for a processing by the network interface processor of FIG. 7 in the case of accepting a response from a disk interface processor.

FIG. 11 is the flow chart for the processing in the case of accepting a response from the DIP 13 at the NIP 11, which proceeds as follows.

When the response from the DIP 13 is accepted (step 61), whether it is a response from NFS or not is judged (step 62). When it is judged as a response from NFS, the response is returned to the network 2 as it is (step 63). When it is not a response from NFS, it is the requested data returned from the DIP 13 so that whether the cache within the NIP local memory 22 is full or not is judged (step 64). If the cache is full, an entry to be expelled is determined and this entry is expelled (step 65), and then the expelled entry is notified to the DIP 13 (step 66). If it is judged that the cache is not full, or after the entry expelling processing is carried out, the NIP 11 writes the returned data into the cache, and transmits this data to the network 2 (step 67).

Figure 12:
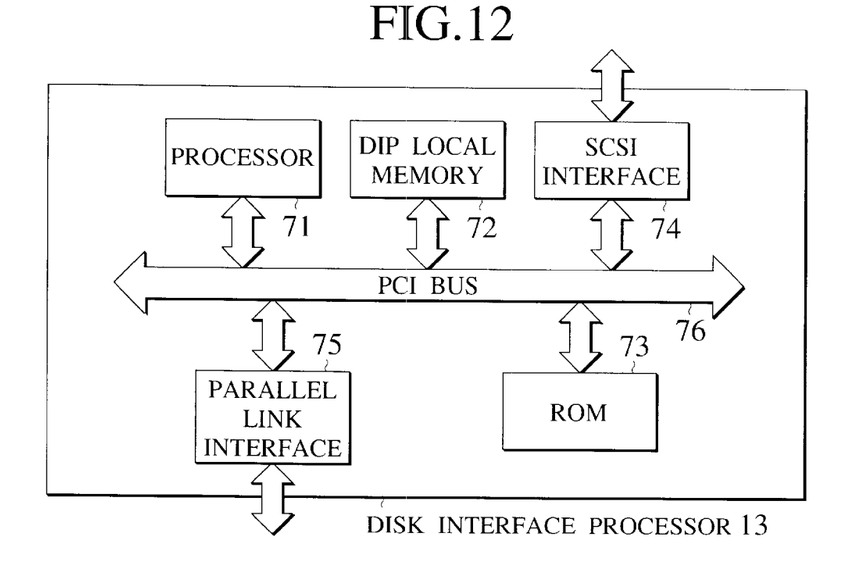
FIG. 12 is a block diagram showing a configuration of a disk interface processor in the server device of FIG. 6.

Next, the DIP 13 will be described in further detail. FIG. 12 shows a configuration of the DIP 13, which comprises a processor 71, a DIP local memory 72, a ROM 73 for storing codes, an SCSI (Small Computer System Interface) interface 74, a parallel link interface 75 and a file buffer memory (not shown).

These units constituting the DIP 13 are connected by a standard bus such as PCI bus 26, for example. Note that the configuration of the NIP is not necessarily limited to that shown in FIG. 7, and it is also possible to connect the processor 71, the DIP local memory 72 and the PCI bus 76 by an ASIC (Application Specific Integrated Circuit) called bridge chip.

Figure 13:
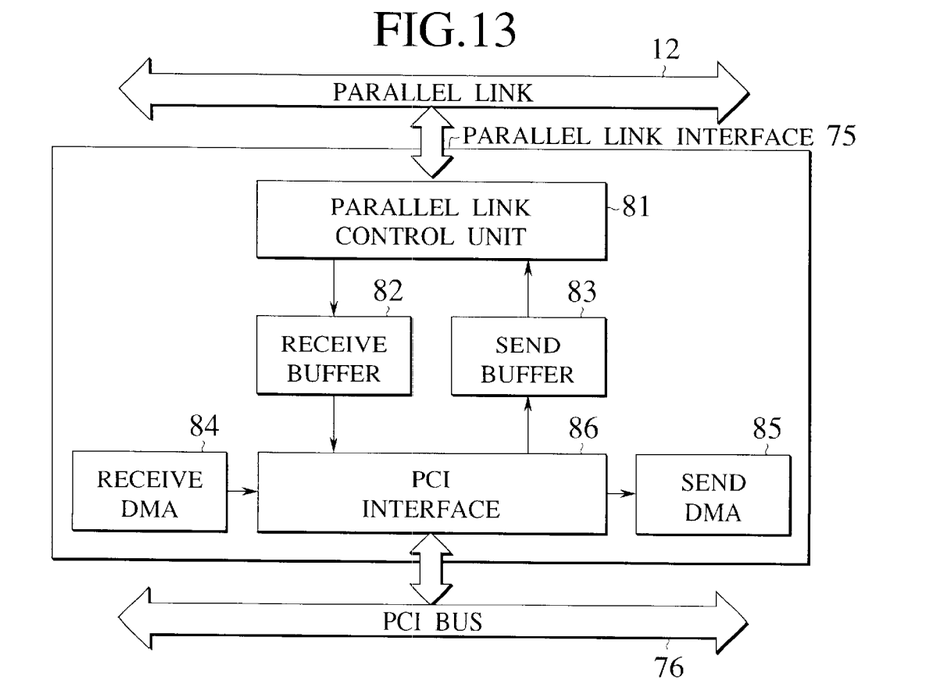
FIG. 13 is a block diagram showing a configuration of a parallel link interface in the disk interface processor of FIG. 12.

FIG. 13 shows a configuration of the parallel link interface 75. As shown in FIG. 13, the parallel link interface 75 comprises a parallel link control unit 81, a Receive buffer 82, a Send buffer 83, a Receive DMA 84, a Send DMA 85, and a PCI interface 86.

The parallel link control unit 81 allows only a communication (message) with the corresponding DIP 13 as its destination to pass among communications from the NIP 11, and transmits it to the Receive buffer 82.

The Receive DMA 84 transfers the data written in the Receive buffer 82 to the DIP local memory 72 through the PCI interface 86.

For the response to the NIP 11, a command is formed by the processor 71 of the DIP 13 and transferred to the Send buffer 83 by the Send DMA 85, and further transmitted to the parallel link 12.

The DIP 13 receives the data request or the cache entry expel notice from the NIP 11 through the parallel link interface 75. When the data request from the NIP 11 is received, the DIP 13 checks whether the requested data exists in the DIP local memory 72 or not. The DIp local memory 72 also has various types of fields for realizing the cache function similarly as in the NIP local memory 22 described with reference to FIG. 8.

Figure 14:
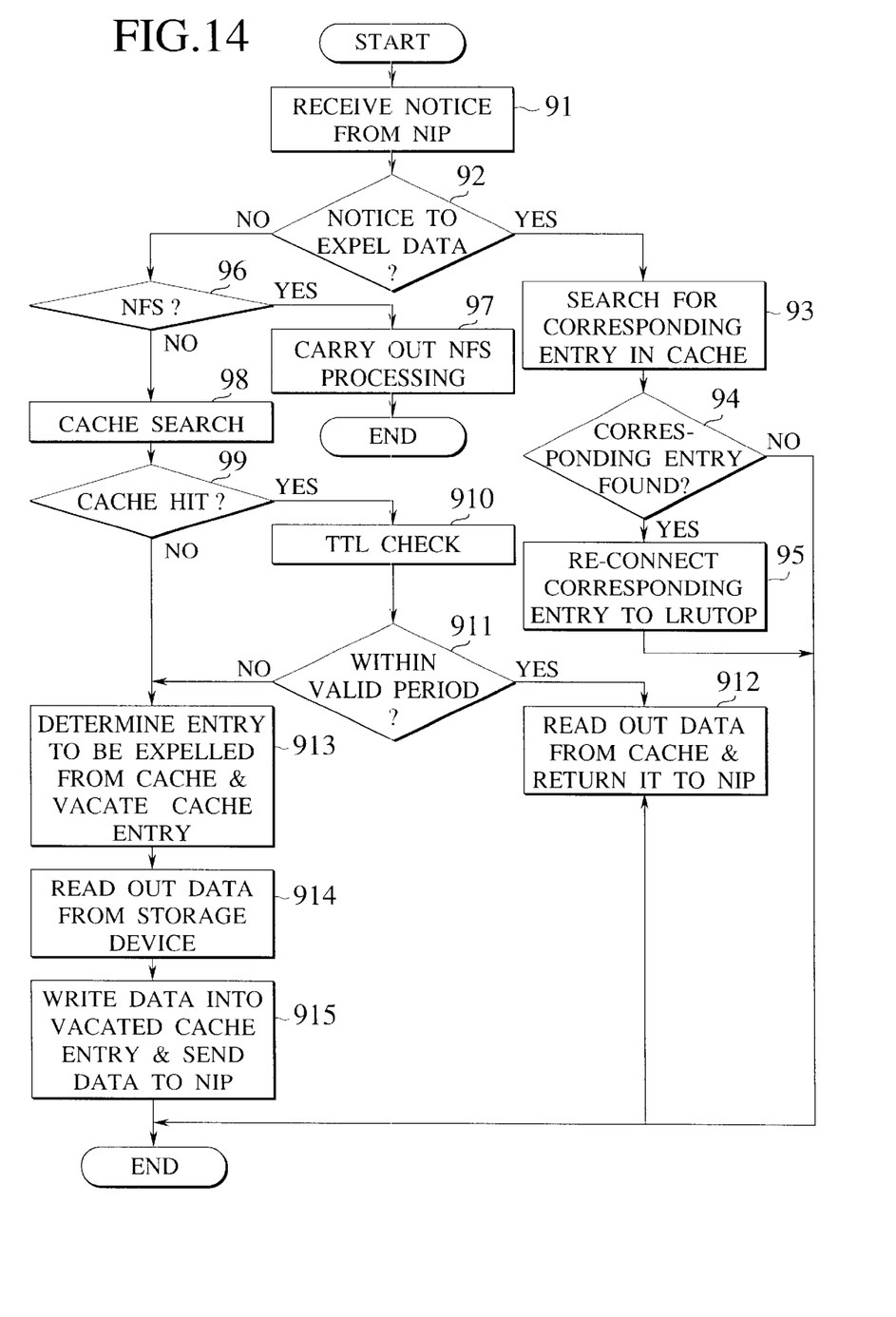
FIG. 14 is a flow chart for a processing by the disk interface processor of FIG. 12.

FIG. 14 is the flow chart for the processing of the DIP 13, which proceeds as follows. When the DIP 13 receives a notice from any NIP 11 (step 91), whether this notice is a notice to expel data or not is judged (step 92). When it is judged as a notice to expel data, the corresponding entry in the cache is searched (step 93). Then, whether there is a corresponding entry or not is judged as a result of the search (step 94), and if it is judged that there is no corresponding entry, nothing is done. On the other hand, when it is judged that there is a corresponding entry, the corresponding entry is re-connected to the LRUTOP (step 95). This is done in order to account whether it is an entry that is expelled from the cache of the NIP local memory 22 or not in the case of expelling the cache entry of the DIP local memory 72.

Namely, when the notice to expel some entry in the NIP local memory 22 is received, if the copy of that entry exists in the DIP local memory 72, the expelling priority order for the corresponding entry in the DIP local memory 72 is set lower, that is, the corresponding entry in the DIP local memory 72 is made to be more difficult to expel. In this way, it is possible to lower the probability for having overlaps among entries in the NIP local memory 22 and entries in the DIP local memory 72. Note that the entry to be expelled is determined by the LRU algorithm in general.

When it is judged as not a notice to expel data at the step 92, whether it is an NFS request or not is judged (step 96), and when it is an NFS request, the NFS processing is carried out (step 97). On the other hand, when it is judged as not an NFS request, the cache search in the DIP local memory 72 is carried out (step 98), and whether the cache hit occurs or not is judged (step 99). When the cache hit occurs, the TTL is checked (step 910), and whether it is within the valid period of not is judged (step 911). When it is judged that the TTL value is within the valid period, the data is read out from the cache and returned to the request source NIP 11 (step 912).

On the other hand, when the cache hit does not occur as a result of the cache search or when it is judged that the TTL value is not within the valid period, the entry to be expelled from the cache is determined, and the cache entry is vacated (step 913). Then, the data is read out from the storage device 14 (step 914), and the read out data is written into the vacated cache entry while the read out data is also transmitted to the request source NIP 11 (step 915).

In this way, in the case of transmitting a file (data) to the network 2, the NIP 11 and the DIP 13 operates cooperatively to utilize the NIP local memory 22 and the DIP local memory 72 as cache memories respectively, and when the data does not exists in the cache memories, the data is read out from the storage device 14. Note that the reading from the storage device 14 is carried out by the file system of the DIP 13 (which is realized by the execution of a program by the processor 71, for example).

Next, the operation of writing from the network 2 into the server device 1 in this embodiment will be described. A writing request from the network 2 is transferred to an appropriate DIP 13 by the NIP 11. Here, the selection of the appropriate DIP 13 is realized at the NIP 11 by utilizing the hashing based on the file name as described above. The DIP 13 to which the request is given from the NIP 11 then carries out the writing of the requested data with respect to the storage device 14. In addition, it is made possible to carry out the reading and writing by the NFS from the network 2 to the storage devices 14 connected to the DIP 13. In order to realize this function, the NIP 11 carries out the processing for relaying NFS communications from the network 2 to the DIP 13.

As the reading and writing from the network 2 to the storage devices 14 connected to the DIP 13 can be realized by the NFS, the storage devices 14 of the server device 1 appear to be realized as a remote file system from a viewpoint of the host machine 3 on the network 2. As they appear as a remote file system from the host machine 3, it becomes possible to fully utilize the existing softwares on the host machine 3.

Note that, this embodiment has been described for a case of using the NFS as a protocol for file writing, but it is also possible to use the other network protocol.

As described, according to the present invention, it becomes possible to transmit files stored in the storage devices to the network efficiently. Moreover, it also becomes possible to obtain the high hit rate by the use of the hierarchical cache management scheme. Furthermore, it also becomes possible to reduce the processing load on the processor by carrying out the parity calculation during the data transfer while the parity calculation only becomes necessary at a time of transmitting the data to the network.

According to the present invention, the high performance can be obtained by carrying out the communication protocol processing distributedly among a plurality of NIPs that are provided in the server device. In addition, by using the NIP local memory provided in the NIP as a cache memory, it is possible to reduce the traffic in the internal bus of the server device so that the scalability can be obtained and the communication latency can be reduced. Also, by providing a plurality of DIPs, the load of the DIPs is distributed and the processing power of the file system is increased. Moreover, by using the DIP local memory provided in the DIP as a cache memory, the load on the storage devices can be reduced.

Also, by using the parity calculation scheme as described above, it is possible to transmit the data to be network without exerting the load on CPU.

Also, by using the cache memory management scheme as described above, the cache memory can be utilized efficiently so that the improved performance by the lesser memory capacity can be expected.

Thus according to the present invention it is possible to provide a server device such as Web server which has a good cost performance as well as a scalability.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A server device, comprising:
   a plurality of network interface processors connected to a network, each network interface processor having a network interface local memory functioning as a cache memory for storing a part of server data in advance and a network interface local processor;
   at least one storage interface processor connected with a storage device for storing the server data; and
   a connection network for connecting the network interface processors and the storage interface processor, wherein,
   the network interface local processor of one network interface processor carries out a control processing such that a requested data among the part of the server data stored in the network interface local memory of the one network interface processor is transmitted directly to the network without requesting said requested data from said storage device through the connection network so as not to increase traffic in the connection network when a request received from the network at the one network interface processor satisfies a prescribed first condition, and that the request is given to the storage interface processor via the connection network when the request satisfies a prescribed second condition and a requested data among the server data stored in the storage device that is returned from the storage interface processor to the one network interface processor via the connection network in response to the request is transmitted to the network.

2. The server device of claim 1, wherein a plurality of storage interface processors are provided, and the network interface local processor of the one network interface processor selects one storage interface processor to which the request is to be given, according to a prescribed information related to the request.

3. The server device of claim 2, wherein the network interface local processor of the one network interface processor selects the one storage interface processor by using a hash function on the prescribed information.

4. The server device of claim 1, wherein the network interface local processor of each network interface processor executes at least a part of a network protocol on the request received from the network and the request data to be transmitted to the network.

5. The server device of claim 1, wherein the network interface local processor of the one network interface processor also writes the requested data returned from the storage interface processor into the network interface local memory of the one network interface processor when a prescribed third condition is satisfied.

6. The server device of claim 1, wherein the storage processor interface has a storage interface local memory functioning as a cache memory for storing a part of the server data and a storage interface local processor.

7. The server device of claim 6, wherein the storage interface local processor carries out a control processing such that the requested data stored in the storage interface local memory Is returned to the one network interface processor when the request given from the one network interface processor via the connection network satisfies a prescribed fourth condition.

8. The server device of claim 6, wherein the storage interface local processor carries out a control processing such that the requested data read out from the storage device in response to the request is written into the storage interface local memory when a prescribed fifth condition is satisfied.

9. The server device of claim 6, wherein the network interface local processor of each network interface processor expels an entry from the network interface local memory and notifies an expelled entry to the storage interface processor, and the storage interface local processor lowers an expelling priority order of the expelled entry notified from the network interface local processor when the expelled entry exists in the storage interface local memory.

10. The server device of claim 1, wherein the one network interface processor also has a connection network interface having a parity calculation unit for calculating a parity of the requested data while transferring the requested data from the storage device to the one network interface processor.

11. The server device of claim 10, wherein the network interface local memory of the one network interface processor stores the requested data along with the parity calculated by the parity calculation unit of the connection network interface.

12. The server device of claim 10, wherein the parity is stored in the network interface local memory for each divided part of a packet to be transmitted to the network in a prescribed length.

13. A file management method at a server device having a plurality of network interface processors connected to a network, each network interface processor having a network interface local memory functioning as a cache memory for storing a part of server data in advance and a network interface local processor, at least one storage interface processor connected with a storage device for storing the server data, and a connection network for connecting the network interface processors and the storage interface processor, the method comprising the steps of:

transmitting a requested data among the part of the server data stored in the network interface local memory of one network interface processor directly to the network without requesting said requested data from said storage device through the connection network so as not to increase traffic in the connection network when a request received from the network at the one network interface processor satisfies a prescribed first condition; and giving the request from the one network interface processor to the storage interface processor via the connection network when the request satisfies a prescribed second condition and transmitting a requested data from the one network interface processor to the network upon receiving the requested data among the server data stored in the storage device that is returned from the storage interface processor to the one network interface processor via the connection network in response to the request.

14. The method of claim 13, wherein the server device has a plurality of storage interface processors, and the method further comprises the step of:

selecting one storage interface processor to which the request is to be given, according to a prescribed information related to the request, at the network interface local processor of the one network interface processor.

15. The method of claim 14, wherein the selecting step selects the one storage interface processor by using a hash function on the prescribed information.

16. The method of claim 13, further comprising the step of:

executing at least a part of a network protocol on the request received from the network and the request data to e transmitted to the network, at the network interface local processor of each network interface processor.

17. The method of claim 13, further comprising the step of:

writing the requested data returned from the storage interface processor into the network interface local memory of the one network interface processor when a prescribed third condition is satisfied.

18. The method of claim 13, wherein the storage processor interface has a storage interface local memory functioning as a cache memory for storing a part of the server data and a storage interface local processor.

19. The method of claim 18, further comprising the step of:

returning the requested data stored in the storage interface local memory from the storage interface processor to the one network interface processor when the request given from the one network interface processor via the connection network satisfies a prescribed fourth condition.

20. The method of claim 18, further comprising the step of:

writing the requested data read out from the storage device in response to the request into the storage interface local memory when a prescribed fifth condition is satisfied.

21. The method of claim 18, further comprising the steps of:

expelling an entry from the network interface local memory and notifying an expelled entry to the storage interface processor; and lowering an expelling priority order of the expelled entry notified from the network interface local processor at the storage interface local processor when the expelled entry exists in the storage interface local memory.

22. The method of claim 13, further comprising the step of:

calculating a parity of the requested data at the one network interface processor while transferring the requested data from the storage device to the one network interface processor.

23. The method of claim 22, further comprising the steps of:

storing the requested data along with the parity calculated at the calculating step at the network interface local memory of the one network interface processor.

24. The method of claim 22, wherein the storing step stores the parity in the network interface local memory for each divided part of a packet to be transmitted to the network in a prescribed length.

* * * * *